US008777729B2

(12) United States Patent
Belger et al.

(10) Patent No.: US 8,777,729 B2
(45) Date of Patent: Jul. 15, 2014

(54) TIME-BASED AWARD SYSTEM WITH DYNAMIC VALUE ASSIGNMENT

(75) Inventors: Matthew Belger, Las Vegas, NV (US); Anthony J. Baerlocher, Reno, NV (US); Dwayne A. Davis, Reno, NV (US); Brian Johnson, Las Vegas, NV (US); Daniel J. DeWaal, Las Vegas, NV (US); Cameron Anthony Filipour, Las Vegas, NV (US); David Muir, Newcastle (AU)

(73) Assignee: IGT, Las Vegas, NV (US)

( * ) Notice: Subject to any disclaimer, the term of this patent is extended or adjusted under 35 U.S.C. 154(b) by 985 days.

(21) Appl. No.: 12/618,463

(22) Filed: Nov. 13, 2009

(65) Prior Publication Data

US 2011/0117991 A1 May 19, 2011

(51) Int. Cl.
*A63F 9/24* (2006.01)
*A63F 13/00* (2006.01)
*G07F 17/32* (2006.01)

(52) U.S. Cl.
CPC ............ *G07F 17/32* (2013.01); *G07F 17/3244* (2013.01); *G07F 17/3255* (2013.01); *G07F 17/3258* (2013.01)
USPC ................... 463/25; 463/16; 463/17; 463/20; 463/21; 463/22; 463/42; 273/138.1; 273/138.2; 273/143 R

(58) Field of Classification Search
USPC ............................. 463/16–17, 20–22, 25, 42; 273/138.1–2, 143 R
See application file for complete search history.

(56) References Cited

U.S. PATENT DOCUMENTS

| | | | | |
|---|---|---|---|---|
| 2,026,082 | A * | 12/1935 | Darrow | 273/256 |
| 4,760,527 | A | 7/1988 | Sidley | |
| 5,393,057 | A | 2/1995 | Marnell, II | |
| 5,564,700 | A | 10/1996 | Celona | |
| 5,816,918 | A | 10/1998 | Kelly et al. | |
| 6,089,960 | A | 7/2000 | Messer | |
| 6,110,042 | A | 8/2000 | Walker et al. | |
| 6,193,608 | B1 | 2/2001 | Walker et al. | |
| 6,227,972 | B1 | 5/2001 | Walker et al. | |
| 6,311,976 | B1 * | 11/2001 | Yoseloff et al. | 273/138.2 |
| 6,319,125 | B1 | 11/2001 | Acres | |
| 6,328,649 | B1 * | 12/2001 | Randall et al. | 463/20 |
| 6,358,149 | B1 | 3/2002 | Schneider et al. | |
| 6,398,218 | B1 | 6/2002 | Vancura | |
| 6,558,255 | B2 | 5/2003 | Walker et al. | |
| 6,575,832 | B1 | 6/2003 | Manfredi et al. | |
| 6,599,193 | B2 | 7/2003 | Baerlocher et al. | |
| 6,602,136 | B1 * | 8/2003 | Baerlocher et al. | 463/16 |
| 6,712,695 | B2 | 3/2004 | Mothwurf et al. | |
| 6,726,563 | B1 | 4/2004 | Baerlocher et al. | |
| 6,726,565 | B2 | 4/2004 | Hughs-Baird | |
| 6,769,984 | B2 | 8/2004 | Duhamel et al. | |
| 6,848,995 | B1 | 2/2005 | Walker et al. | |
| 6,890,256 | B2 | 5/2005 | Walker et al. | |

(Continued)

*Primary Examiner* — William Brewster
*Assistant Examiner* — Ryan Hsu
(74) *Attorney, Agent, or Firm* — Neal, Gerber & Eisenberg LLP

(57) ABSTRACT

A coupled to at least one server via a network includes a display device configured to display a base game to a player playing at the gaming machine, and a controller coupled to the display device. The controller is configured to determine an outcome during play of the base game, and award at least one token based on the outcome of the base game, wherein a value of the token based on as additional play of the base game by the player.

22 Claims, 17 Drawing Sheets

(56) References Cited

U.S. PATENT DOCUMENTS

| | | | | |
|---|---|---|---|---|
| 6,908,383 | B2 * | 6/2005 | Baerlocher et al. | 463/20 |
| 6,918,834 | B2 | 7/2005 | Vancura | |
| 7,040,982 | B1 | 5/2006 | Jarvis et al. | |
| 7,048,628 | B2 | 5/2006 | Schneider | |
| 7,063,618 | B2 | 6/2006 | Walker et al. | |
| 7,086,947 | B2 | 8/2006 | Walker et al. | |
| 7,094,149 | B2 | 8/2006 | Walker et al. | |
| 7,169,047 | B2 | 1/2007 | Benbrahim | |
| 7,267,614 | B1 | 9/2007 | Jorasch et al. | |
| 7,318,775 | B2 | 1/2008 | Brosnan et al. | |
| 7,338,360 | B2 | 3/2008 | Jarvis et al. | |
| 7,458,892 | B2 | 12/2008 | Walker et al. | |
| 7,473,177 | B2 | 1/2009 | Walker et al. | |
| 7,481,705 | B2 | 1/2009 | Jarvis et al. | |
| 7,488,245 | B2 | 2/2009 | Jarvis et al. | |
| 7,549,920 | B2 | 6/2009 | Jorasch et al. | |
| 7,601,060 | B2 | 10/2009 | Baerlocher et al. | |
| 7,658,674 | B2 | 2/2010 | Walker et al. | |
| 7,704,145 | B2 | 4/2010 | Glisson et al. | |
| 7,717,786 | B1 * | 5/2010 | Falciglia, Sr. | 463/19 |
| 7,780,525 | B2 | 8/2010 | Walker et al. | |
| 7,789,755 | B2 * | 9/2010 | Davis et al. | 463/26 |
| 7,794,316 | B2 | 9/2010 | Palmer et al. | |
| 7,819,736 | B2 | 10/2010 | Jarvis et al. | |
| 7,862,426 | B2 | 1/2011 | Walker et al. | |
| 7,878,896 | B2 | 2/2011 | Jorasch et al. | |
| 7,878,901 | B2 | 2/2011 | Walker et al. | |
| 8,029,357 | B2 | 10/2011 | Jorasch et al. | |
| 8,088,001 | B2 * | 1/2012 | Preisach | 463/25 |
| 8,137,187 | B2 | 3/2012 | Walker et al. | |
| 8,167,309 | B1 | 5/2012 | Laut | |
| 8,167,705 | B2 | 5/2012 | Jorasch et al. | |
| 8,231,455 | B2 | 7/2012 | Walker et al. | |
| 8,231,457 | B2 | 7/2012 | Jarvis et al. | |
| 8,277,303 | B2 * | 10/2012 | Duhamel et al. | 463/20 |
| 8,382,582 | B2 | 2/2013 | Sammon et al. | |
| 2001/0034649 | A1 * | 10/2001 | Acres | 705/14 |
| 2002/0072413 | A1 | 6/2002 | Arias et al. | |
| 2002/0142846 | A1 | 10/2002 | Paulsen | |
| 2002/0161631 | A1 | 10/2002 | Banerjee et al. | |
| 2003/0078101 | A1 | 4/2003 | Schneider et al. | |
| 2003/0092477 | A1 | 5/2003 | Luciano, Jr. et al. | |
| 2003/0176210 | A1 | 9/2003 | Vancura | |
| 2003/0176217 | A1 | 9/2003 | vancura | |
| 2003/0216169 | A1 | 11/2003 | Walker et al. | |
| 2003/0220135 | A1 | 11/2003 | Gauselmann | |
| 2004/0106454 | A1 | 6/2004 | Walker et al. | |
| 2004/0142742 | A1 | 7/2004 | Schneider et al. | |
| 2004/0176159 | A1 * | 9/2004 | Walker et al. | 463/20 |
| 2004/0192432 | A1 * | 9/2004 | Walker et al. | 463/20 |
| 2004/0229700 | A1 | 11/2004 | Cannon et al. | |
| 2005/0086143 | A1 | 4/2005 | Vlazny et al. | |
| 2005/0143164 | A1 * | 6/2005 | Duhamel et al. | 463/20 |
| 2005/0182678 | A1 | 8/2005 | Walker et al. | |
| 2006/0068893 | A1 | 3/2006 | Jaffe et al. | |
| 2006/0121983 | A1 | 6/2006 | Walker et al. | |
| 2006/0128462 | A1 | 6/2006 | Jorasch et al. | |
| 2006/0205486 | A1 | 9/2006 | Walker et al. | |
| 2006/0217186 | A1 | 9/2006 | Jorasch et al. | |
| 2006/0247015 | A1 | 11/2006 | Walker et al. | |
| 2006/0252527 | A1 | 11/2006 | Walker et al. | |
| 2007/0032288 | A1 | 2/2007 | Nelson et al. | |
| 2007/0077979 | A1 | 4/2007 | Cohn et al. | |
| 2007/0087834 | A1 | 4/2007 | Moser et al. | |
| 2007/0172035 | A1 | 7/2007 | Sussman et al. | |
| 2007/0173317 | A1 | 7/2007 | Walker et al. | |
| 2007/0202943 | A1 * | 8/2007 | Thomas | 463/27 |
| 2007/0233585 | A1 * | 10/2007 | Ben Simon et al. | 705/35 |
| 2007/0243928 | A1 | 10/2007 | Iddings | |
| 2007/0293309 | A1 | 12/2007 | Jorasch et al. | |
| 2008/0032762 | A1 | 2/2008 | Kane et al. | |
| 2008/0085755 | A1 * | 4/2008 | Okada | 463/20 |
| 2008/0108429 | A1 | 5/2008 | Davis et al. | |
| 2008/0146346 | A1 | 6/2008 | Hardy et al. | |
| 2008/0188292 | A1 | 8/2008 | Walker et al. | |
| 2008/0274792 | A1 | 11/2008 | Walker et al. | |
| 2009/0075727 | A1 | 3/2009 | Walker et al. | |
| 2009/0131141 | A1 | 5/2009 | Walker et al. | |
| 2009/0143141 | A1 | 6/2009 | Wells et al. | |
| 2010/0041470 | A1 * | 2/2010 | Preisach | 463/25 |
| 2010/0174600 | A1 | 7/2010 | Walker et al. | |
| 2010/0267444 | A1 | 10/2010 | Walker et al. | |
| 2010/0285869 | A1 | 11/2010 | Walker et al. | |
| 2010/0304841 | A1 | 12/2010 | Sammon et al. | |
| 2011/0070944 | A1 | 3/2011 | de Waal et al. | |
| 2011/0106603 | A1 | 5/2011 | McCann et al. | |
| 2011/0130188 | A1 | 6/2011 | Walker et al. | |
| 2013/0190076 | A1 | 7/2013 | Sammon et al. | |

* cited by examiner

TIME-BASED AWARD SYSTEM WITH DYNAMIC VALUE ASSIGNMENT

BACKGROUND

The embodiments described herein relate generally to gaming systems and, more particularly, to gaming systems and methods that provide player rewards.

At least some known gaming systems provide a bonus pool, and provide shares of the bonus pool to one or more actively played gaming machines within the gaming system. For example, at least some of such known gaming systems distribute the bonus pool to gaming machines based on a value of the bonus pool and/or the number of shares obtained using each gaming machine.

Moreover, at least some known gaming systems provide a proportional payout of a progressive jackpot. A system controller receives data representing wager amounts from each of a plurality of gaming machines, and in response, determines a value of the progressive jackpot using a portion of each wager amount. When a winning outcome occurs at one of the gaming machines, the system controller announces the win and pays the winning player a portion of the jackpot based on a predetermined proportional algorithm.

Furthermore, at least some known gaming systems provide incentives to players to play a game that includes at least one winning outcome among a plurality of outcomes. In order for a player to redeem the winning outcome, the player must present the winning outcome at a redemption location, such as a casino. For example, at least some known gaming systems provide an online game to players via the Internet, and require the players to return to a casino to redeem a prize won during play of the online game.

BRIEF DESCRIPTION

In one aspect, a gaming machine is provided. The gaming machine is coupled to at least one server via a network and includes a display device configured to display a base game to a player playing at the gaming machine, and a controller coupled to the display device. The controller is configured to determine an outcome of the base game, and award at least one token based on the outcome of the base game, wherein a value of the token increases based on additional play of the base game by the player.

In another aspect, a gaming system is provided. The gaming system includes a plurality of gaming machines that each includes a display device configured to display a base game and a bonus game to a player, and at least one server coupled to the gaming machines via a network. The server is configured to detect a bonus trigger during play of the base game at one of the gaming machines, initiate the bonus game, and award at least one token based on an outcome of the bonus game, wherein a value of the token increases based on additional play of the base game and the bonus game by the player.

In another aspect, a method is provided for providing awards in a gaming system that includes at least one gaming machine and at least one server coupled to the gaming machine via a network. The method includes initiating play of a base game on the gaming machine, and determining an outcome of the base game. The method also includes awarding at least one token based on the outcome, wherein the token includes an initial value, and incrementing the value of the token as additional players earn tokens during play of the base game.

In yet another aspect, one or more computer-readable storage media are provided having computer-executable components for providing awards in a gaming system that includes at least one gaming machine and at least one server coupled to the gaming machine via a network. The computer-executable components include a base game component that causes at least one processor to display a base game via the gaming machine, determine an outcome of the base game, and award at least one token based on the outcome, wherein the token includes an initial value. The computer-executable components also include a token management component that causes the at least one processor to increment the value of the token based on additional play of the base game by the player.

BRIEF DESCRIPTION OF THE DRAWINGS

The embodiments described herein may be better understood by referring to the following description in conjunction with the accompanying drawings.

DETAILED DESCRIPTION

Exemplary embodiments of apparatus, methods, systems, and computer-readable storage media for use in time-based awards with dynamic value assignment are described hereinabove. The embodiments described herein facilitate awarding players with compounding bonus equity through the use of highly unpredictable outcomes. Awarding compounding bonus equity facilitates generating long-term loyalty among players in that new players pass value to early entry players that have played for longer periods in order to accumulate greater equity.

Exemplary technical effects of apparatus, methods, systems, and computer-readable media described herein include at least one of: (a) initiating play of a base game at a gaming machine; (b) detecting a bonus trigger during play of the base game; (c) initiating a bonus game in response to detecting the bonus trigger; (d) determining an outcome of the bonus game; (e) awarding at least one token portion based on a winning outcome of the bonus game; (f) accumulating a specified number of token portions, and awarding a token award that includes an initial value; (g) incrementing the value of the token during one or more play sessions based on the award of tokens to other players; and (h) initiating a token transaction, including a token redemption, a token sale between two players or between a player and the gaming system, a token purchase between two players or between a player and the gaming system, or a token trade between two players or between a player and the gaming system.

Figure 1:
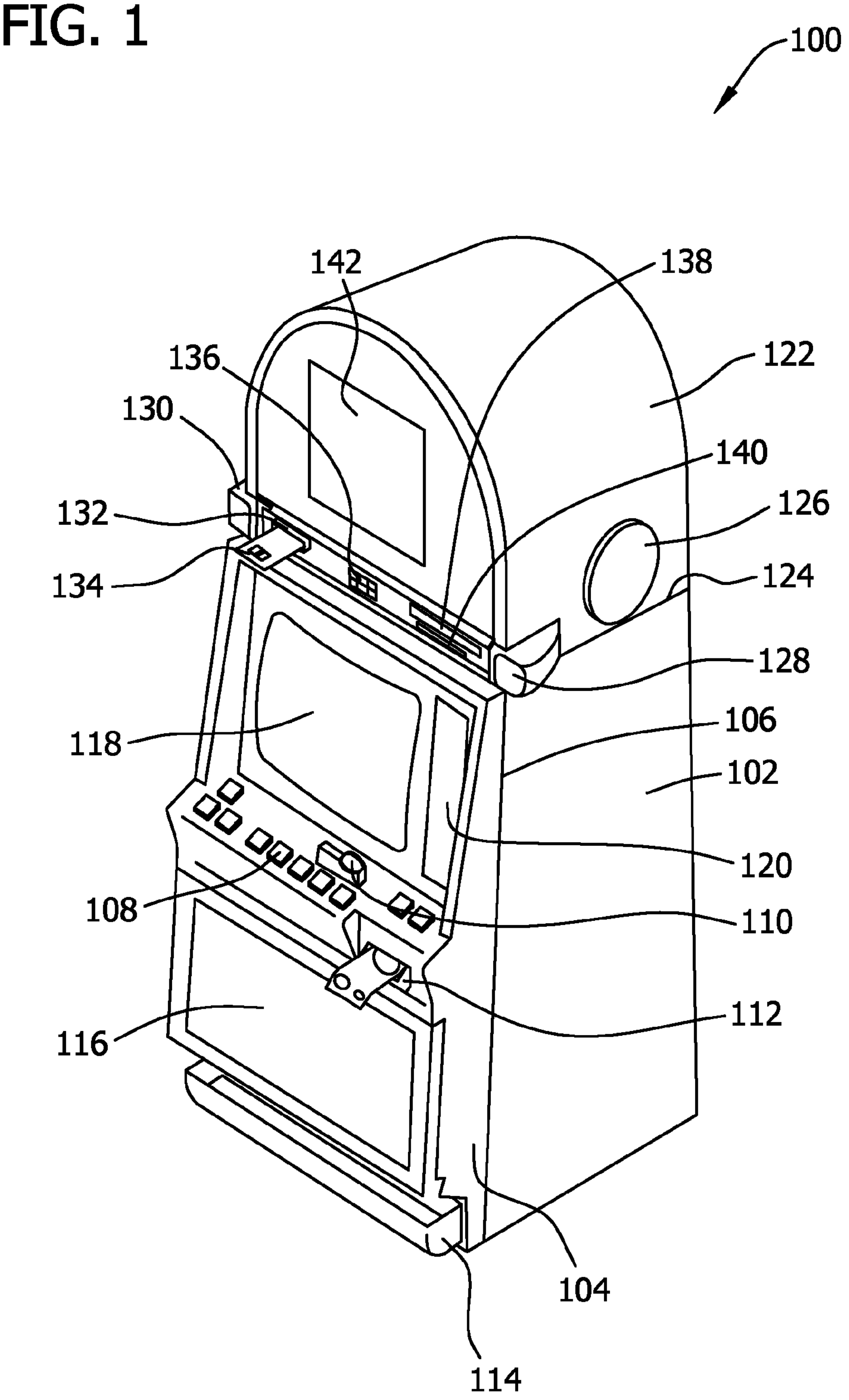
FIG. 1 is a perspective view of an exemplary gaming machine.

FIG. 1 is a schematic diagram of an exemplary gaming machine 100 that provides redeemable award opportunities, or tokens, during play of a game. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a main cabinet 102 having a main door 104 coupled to a front 106 of gaming machine 100. When opened, door 104 provides access to an interior (not shown) of gaming machine 100. In the exemplary embodiment, a plurality of player-input switches and/or buttons 108 is coupled to main door 104. Moreover, in the exemplary embodiment, a coin acceptor 110, for accepting coins and/or tokens, a bill acceptor 112, for accepting and/or validating cash bills, coupons and/or ticket vouchers, a coin tray 114, for collecting a coin-based payout, and a belly glass 116 are each coupled to main door 104. A primary display device 118 and an information panel 120 are viewable through main door 104. Primary display device 118 may be implemented as a cathode ray tube (CRT), a flat-panel liquid crystal display (LCD), a plasma display, an organic light-emitting diode (OLED) display, a multi-layer display (MLD), or any other electronically-controlled video monitor. Moreover, primary display device 118 may include touch screen capabilities. In the exemplary embodiment, information panel 120 is a back-lit, silk screened glass panel that includes lettering to indicate general game information including, for example, a number of coins wagered. Coin acceptor 110, bill acceptor 112, player-input buttons 108, video display monitor 118, and information panel 120 are each used by a player to play a game on gaming machine 100. Each component 108, 110, 112, 118, and/or 120 is controlled by a gaming machine controller (not shown in FIG. 1) that is housed inside main cabinet 102. Numerous games including, but not limited to only including, video slot games, video poker, video pachinko, video black jack, video card games, and/or video keno may be implemented for play on gaming machine 100.

In the exemplary embodiment, gaming machine 100 also includes a top box 122 that is positioned on a top surface 124 of main cabinet 102. In the exemplary embodiment, top box 122 includes a number of devices that may be used to add features to a game being played on gaming machine 100. Such devices may include, but are not limited to only including, speakers 126, 128, and 130, a ticket printer 132 for printing bar-coded tickets 134, a key pad 136 for entering player tracking information, or player preferences or characteristics, a display 138 for displaying player tracking information and/or player preferences or characteristics, and a card reader 140 for receiving a card containing player tracking information and/or player preferences or characteristics encoded thereon. Card reader 140 may also be used to accept credit cards, printed cards, smart cards, and/or other magnetic stripe cards. Moreover, top box 122 includes a secondary display device 142 that displays, for example, player information, an attract sequence, a bonus game, or any other suitable images. Secondary display device 142 may be implemented as a cathode ray tube (CRT), a flat-panel liquid crystal display (LCD), a plasma display, an organic light-emitting diode (OLED) display, a multi-layer display (MLD), or any other electronically-controlled video monitor. Moreover, secondary display device 142 may include touch screen capabilities. Top box 122 may house additional devices not shown in FIG. 1, such as, for example, a bonus wheel and/or a back-lit silk screened panel that may be used to add bonus features to a game being played on gaming machine 100. During game play, such devices may be controlled by circuitry, such as the gaming machine controller housed within main cabinet 102.

In the exemplary embodiment, gaming machine 100 includes a token interface. The token interface may be displayed via primary display device 118 or secondary display device 142. As described in more detail below, the token interface displays player information and/or player account information to a player, including details related to redeemable award tokens.

Figure 2:
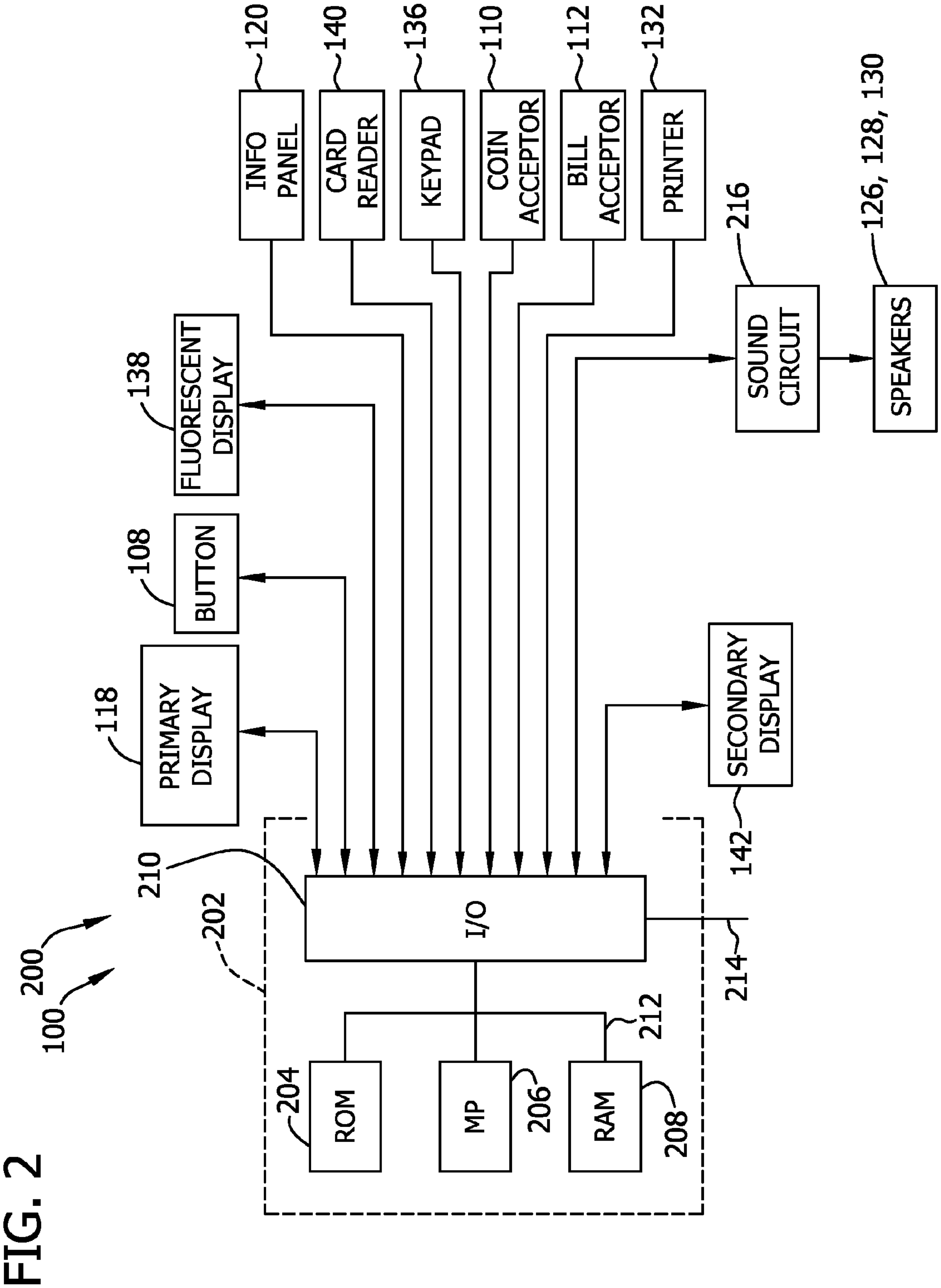
FIG. 2 is a block circuit diagram of an exemplary electrical architecture that may be used with the gaming machine shown in FIG. 1.

FIG. 2 is a block circuit diagram of an exemplary electrical architecture 200 incorporated into an exemplary gaming machine, such as gaming machine 100. In the exemplary embodiment, gaming machine 100 includes a gaming machine controller 202 that includes a read-only memory (ROM) 204, a microcontroller or microprocessor (MP) 206, a random-access memory (RAM) 208, and an input/output (I/O) circuit 210, each coupled via an address/data bus 212. As used herein, the terms "controller" and "processor" may include any programmable system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the terms "controller" or "processor". Alternative embodiments of controller 202 may include more than one microprocessor 206, multiple RAM modules 208, and/or multiple ROM modules 204. Moreover, although I/O circuit 210 is shown in FIG. 2 as a single component, one of ordinary skill in the art will appreciate that I/O circuit 210 may include any number or a plurality of different types of I/O circuits. Further, RAM 208 and/or ROM 204 may be implemented as, for example, semiconductor memories, magnetically readable memories, and/or optically readable memories. In one embodiment, each operational component of gaming machine 100 is coupled to I/O circuit 210 via a respective conductor and/or via bus 212. Alternative embodiments may include a single coupling between the operational components of gaming machine 100 and I/O circuit 210. In the exemplary embodiment, I/O circuit 210 is coupled to a gaming network (not shown) via a network interface 214. Moreover, in the exemplary embodiment, architecture 200 includes a sound circuit 216 that generates audio signals and that communicates the audio signals between I/O circuit 210 and speakers 126, 128, and/or 130.

Figure 3:
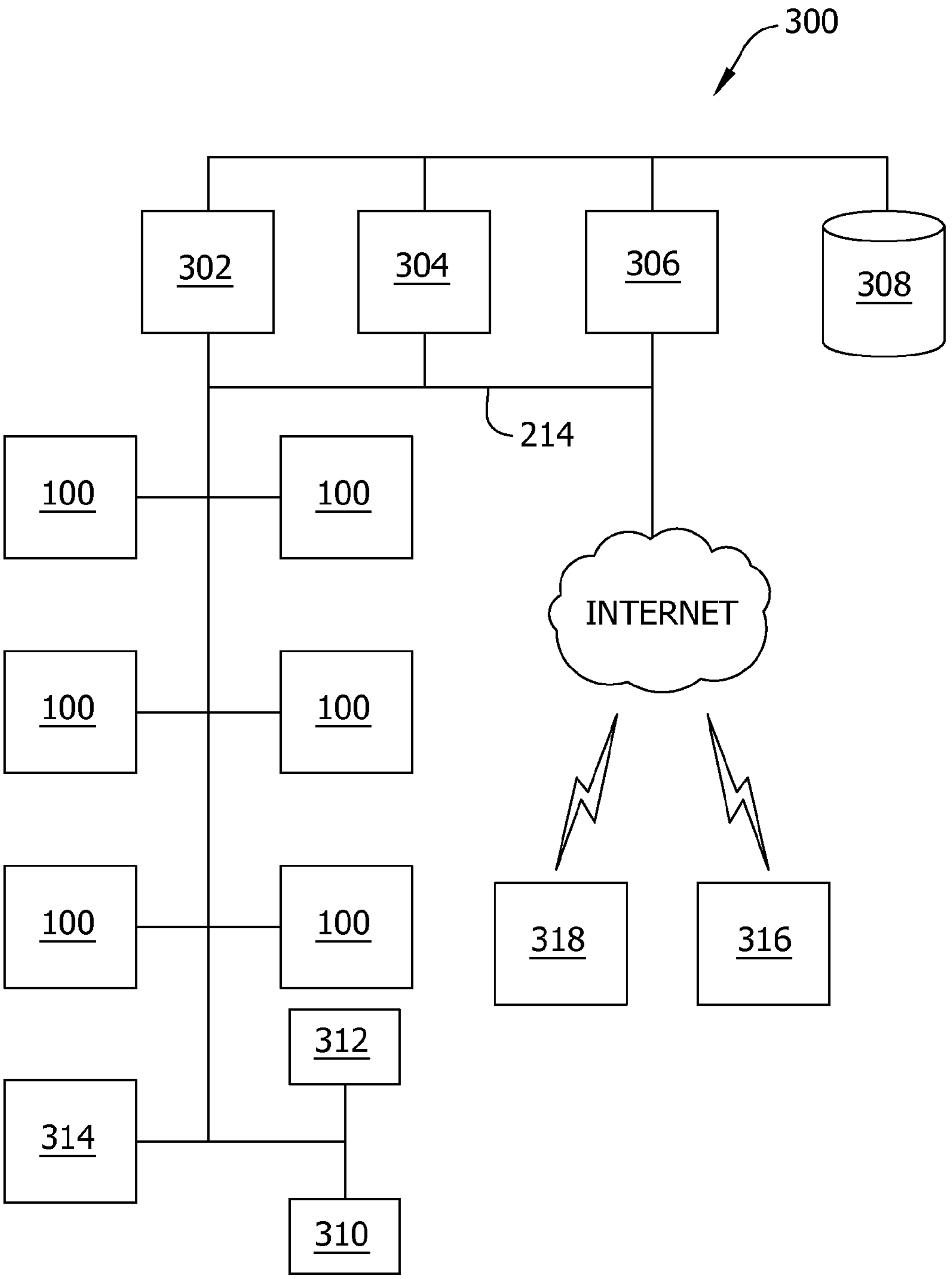
FIG. 3 is a block schematic diagram of an exemplary gaming system.

FIG. 3 is a block schematic diagram of an exemplary gaming system 300 that includes a plurality of gaming machines 100. Each gaming machine 100 is coupled via a network connection 214 to one or more servers, such as a token management server 302, an accounting server 304, and a player tracking server 306. Each server 302, 304, and 306 includes a processor (not shown) that facilitates data communication between each gaming machine 100 and other components of gaming system 300. Such data is stored in, for example, a database 308 that is coupled to each server 302, 304, and 306. Moreover, each server 302, 304, and 306 also includes audio capabilities, such as a CD-ROM drive (not shown) or DVD-ROM drive (not shown), that are coupled to a sound card (not shown) for processing and transmitting digitized sound effects to one or more speakers 310 in response to commands issued over gaming system 300 by a corresponding server 302, 304, and/or 306. Each server 302, 304, and 306 is also coupled via gaming system 300 to an electronic sign or screen 312 that displays information, such as via scrolling and/or flashing messages that indicate, for example, progressive and/or jackpot amounts, and that are visible to players playing gaming machines 100. Messages for display on each electronic screen 312 are generated and/or modified in response to commands issued over gaming system 300 by servers 302, 304, and/or 306.

As described above, gaming machines 100 may include video poker machines, video slot machines, and/or other similar gaming machines that implement alternative games. Moreover, gaming machines 100 may be terminal-based machines, wherein the actual games, including random number generation and/or outcome determination, are performed at a server, such as servers 302, 304, and/or 306. In such an embodiment, gaming machine 100 displays results of the game via primary display device 118 (shown in FIG. 1).

Moreover, in the exemplary embodiment, gaming system 300 includes a configuration workstation 314 that includes a user interface that enables an administrator to set up and/or to modify portions of gaming system 300 and/or servers 302, 304, and 306. Player tracking server 306 tracks data of players using gaming machines 100, and also controls messages that appear on each display device 118 and 142 and/or information panel 120 of gaming machines 100. In the exemplary embodiment, player tracking server 306 also stores physical characteristics of players, such as the player age and/or vision data. Token management server 302 controls bonus applications or bonus systems that award token opportunities on gaming system 300. Moreover, token management server 302 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode. Player tracking server 306 may store data related to the players and tracked using player tracking identification, such as a player card. Moreover, player tracking server 306 may store information and data about the player such as loyalty points, player address, phone number, and any information that may be retrieved and transmitted to the token management server 302. Accounting server 304 may store and track information such as, but not limited to, the average amount of wager played by the player, and/or any funds the player may have in an account.

Furthermore, in the exemplary embodiment, gaming system 300 includes one or more remote computers 316 and/or mobile devices 318 that access system 300 via an external network, such as the Internet.

Figure 4:
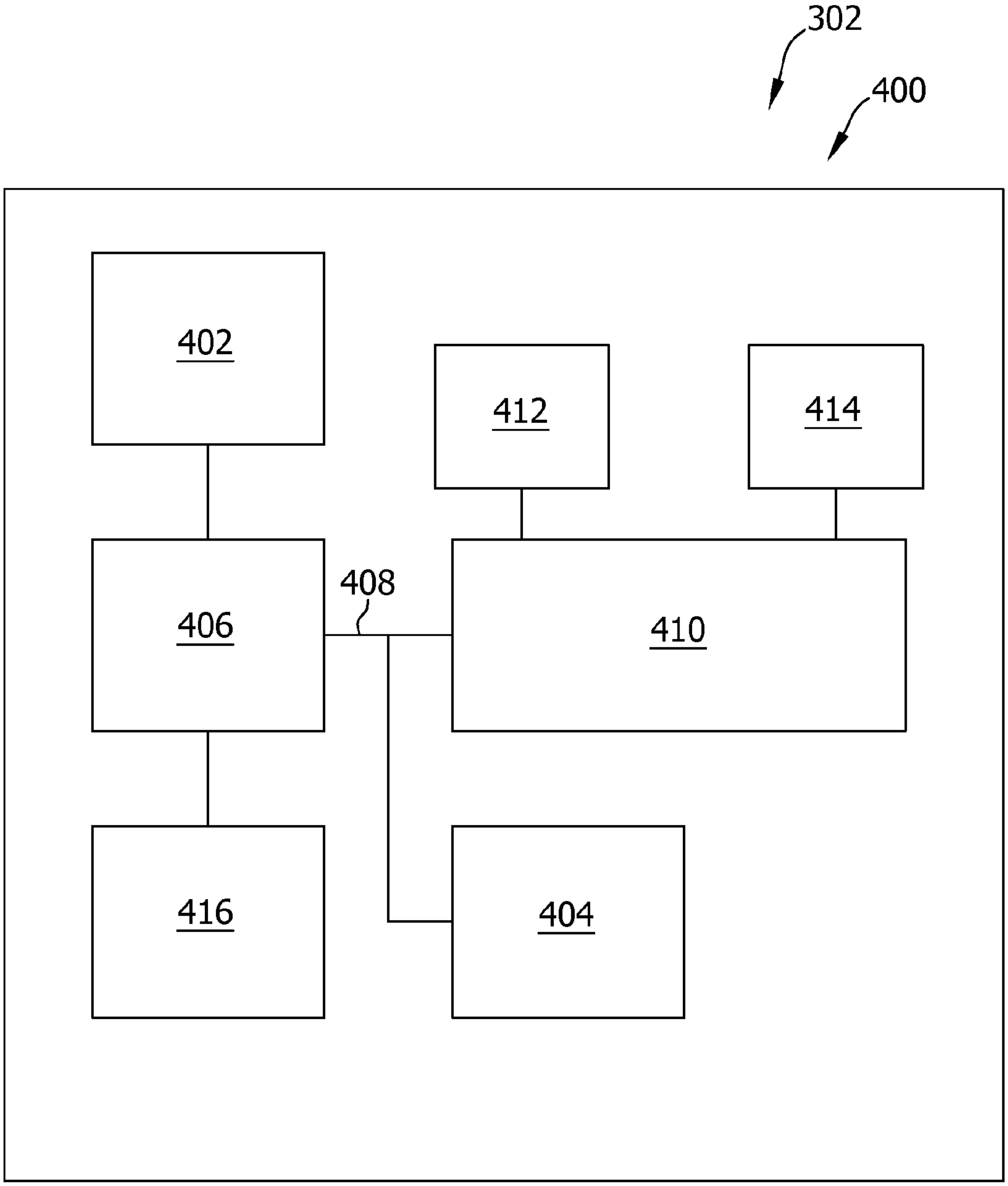
FIG. 4 is a schematic block diagram of an exemplary electrical architecture of a token management server that may be used with the gaming system shown in FIG. 3.

FIG. 4 is a schematic block diagram of an exemplary electrical architecture 400 of token management server 302. In the exemplary embodiment, token management server 302 includes a network interface 402 that facilitates communication between server 302 and gaming system 300 (shown in FIG. 3). Interface 402 is not intended to be limiting, as any combination of hardware and software may be used as desired to allow the various input/output devices to communicate with token management server 302. Moreover, in the exemplary embodiment, token management server 302 includes one or more memory modules 404, such as a read-only memory (ROM) and/or a random-access memory (RAM). Memory 404 is coupled to a microcontroller or central processor unit (CPU) 406 via an address/data bus 408. As used herein, the terms "controller" and "processor" may include any programmable system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the terms "controller" or "processor". Alternative embodiments of architecture 400 may include more than one processor 406 and/or multiple memory modules 404. Moreover, memory 404 may be implemented as, for example, semiconductor memory, magnetically readable memory, and/or optically readable memory.

In some embodiments, token management server 302 also includes a configuration manager 410 that enables a user to setup, configure, and/or modify various token awards 412 that are offered and qualifying criteria 414 that must be satisfied before awards 412 are offered to the player. For example, qualifying criteria 414 may be any parameters such as game theme, denomination, location in the casino, bonus length, player data, prizes offered, bonus type, bonus acceptance time, or any other desired qualifying criteria. Configuration manager 410 may be used in cooperation with configuration workstation 314 (shown in FIG. 3).

In the exemplary embodiment, token management server 302 also includes a token communicator 416 that is coupled to processor 406. Token communicator 416 gathers the necessary data and information associated with token awards and players from accounting server 304 and player tracking server 306 (both shown in FIG. 3). In some embodiments, a casino may have separate systems for player tracking, accounting, cage and credit system, and the like. Thus, in order for the various token awards to be offered, token management server 302 communicates and obtains information from each of the various systems. For example, token communicator 416 communicates with player tracking server 306 to retrieve information about the player to determine the player's eligibility to receive a token, as described in more detail below.

Figure 5:
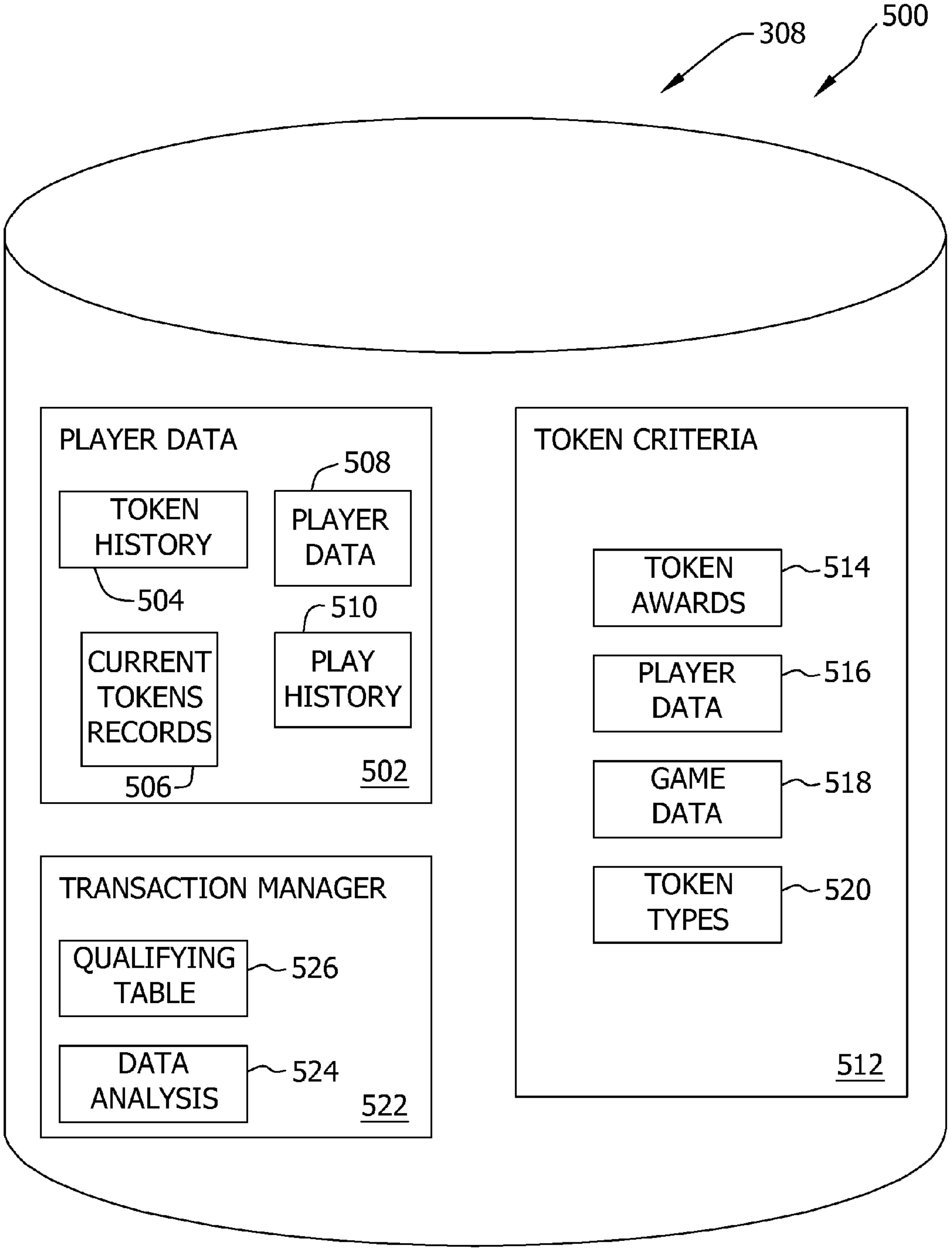
FIG. 5 is a schematic block diagram of a plurality of data storage tables of an exemplary database that may be used with the gaming system shown in FIG. 3.

FIG. 5 is a schematic block diagram of a plurality of exemplary data storage tables 500 stored by database 308. In some embodiments, database 308 may be implemented by a plurality of databases 308. In the exemplary embodiment, database 308 stores player data 502, such as a player's token history 504. Tokens that the player was previously awarded may be saved in the database 308 and may be used to determine and/or customize future bonuses offered to the player. Current token records 506 may also be saved in database 308.

Player data records 508 may be obtained from player tracking server 306 (shown in FIG. 4) and saved in database 308. The information obtained may include a player's ratings, a number of points accumulated in the loyalty program, the player's residence, and any other information necessary to determine the player's eligibility to receive a token. Additionally, play history records 510 may be stored in database 308. Play history records 510 may be used to customize the bonuses offered to the player to keep a player's interest in playing a game of chance.

Database 308 also stores token criteria 512. Criteria 512 may be any information used to determine whether a player is qualified to receive a particular token 514. Token criteria records 512 may be include player data records 516, a type of game played 518, a plurality of types of tokens 520, or any other token criteria 512. For example, token types 520 may be used to designate a token portfolio that includes a specific number of tokens of each of a number of token types 520. A player that accumulates the specific number of tokens to complete a portfolio may receive, for example, an additional bonus prize. Token types 520 required to complete a portfolio may be based on any number of criteria such as, but not limited to, player level and/or frequency of play by a player.

Processor 406 (shown in FIG. 5) may be configured to execute transaction manager 522 to detect a transaction request made by a player. For example, transaction manager 522 may initiate a trade transaction between one or more players, and/or between a player and token management server 302. Transaction manager 522 may also initiate sales and/or purchase transactions between one or more players and/or between a player and token management server 302. Such transactions may be completed to enable a player to complete a portfolio. Transaction manager 522 includes a data analysis application 524 that analyzes and determines whether a token is included in a particular portfolio, and/or whether a token is eligible to be traded, sold, and/or purchased. Data analysis application 524 determines whether each token is eligible for such transactions according to a qualifying table 526.

Figure 6:
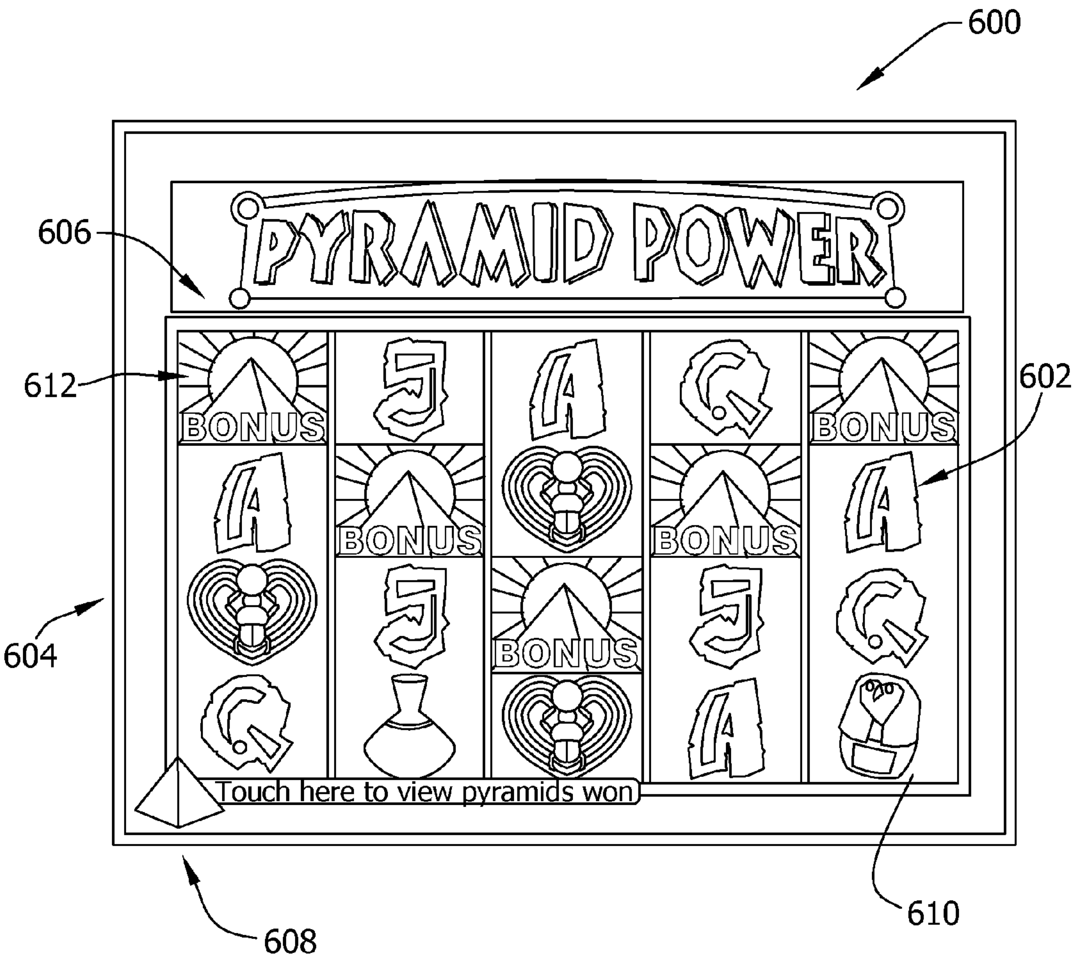
FIG. 6 is a view of an exemplary base game that may be used with the gaming machine shown in FIG. 1.

FIG. 6 is a screen view of an exemplary base game 600 as displayed by gaming machine 100 (shown in FIGS. 1 and 2) and, more specifically, by primary display device 118 (shown in FIGS. 1 and 2). In the exemplary embodiment, base game view 600 includes a plurality of symbols 602 arranged in a plurality of rows 604 and in a plurality of columns 606. Base game view 600 also includes a token interface symbol 608 that, when activated by a player, displays a token interface (not shown).

During play of base game 600, a player selects one or more paylines (not shown) and initiates base game 600 using, for example, buttons 108 (shown in FIGS. 1 and 2) or via touch on primary display device 118. Each payline includes a plurality of specific symbol locations 610 arranged across columns 606. In the exemplary embodiment, each column 606 is depicted using video images on primary display device 118. In an alternative embodiment, each column 606 is produced on a separate reel device (not shown) that is positioned adjacent to an inner surface (not shown) of primary display device 118. In the exemplary embodiment, a bonus game is initiated when a predetermined number of bonus trigger symbols 612 are displayed as an outcome of base game 600.

Figure 7:
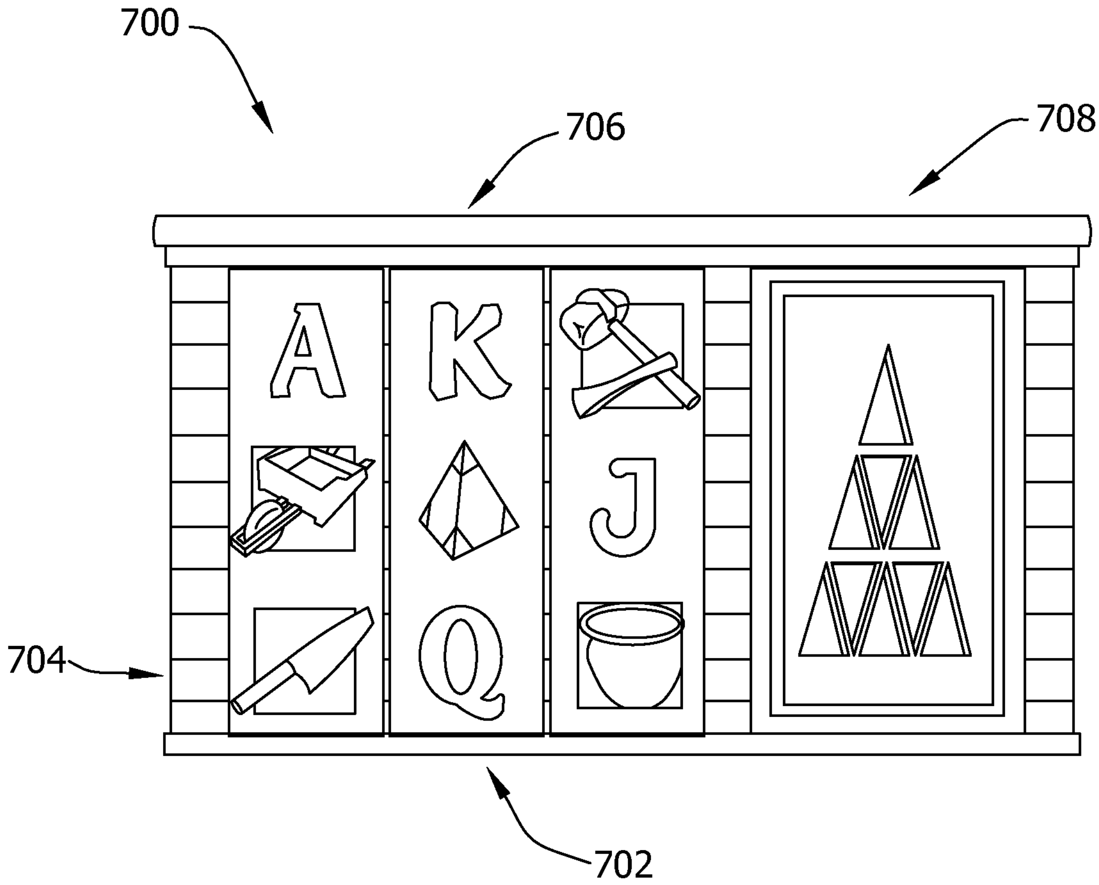
FIGS. 7-9 are views of an exemplary bonus game that may be used with the gaming machine shown in FIG. 1.
Figure 8:
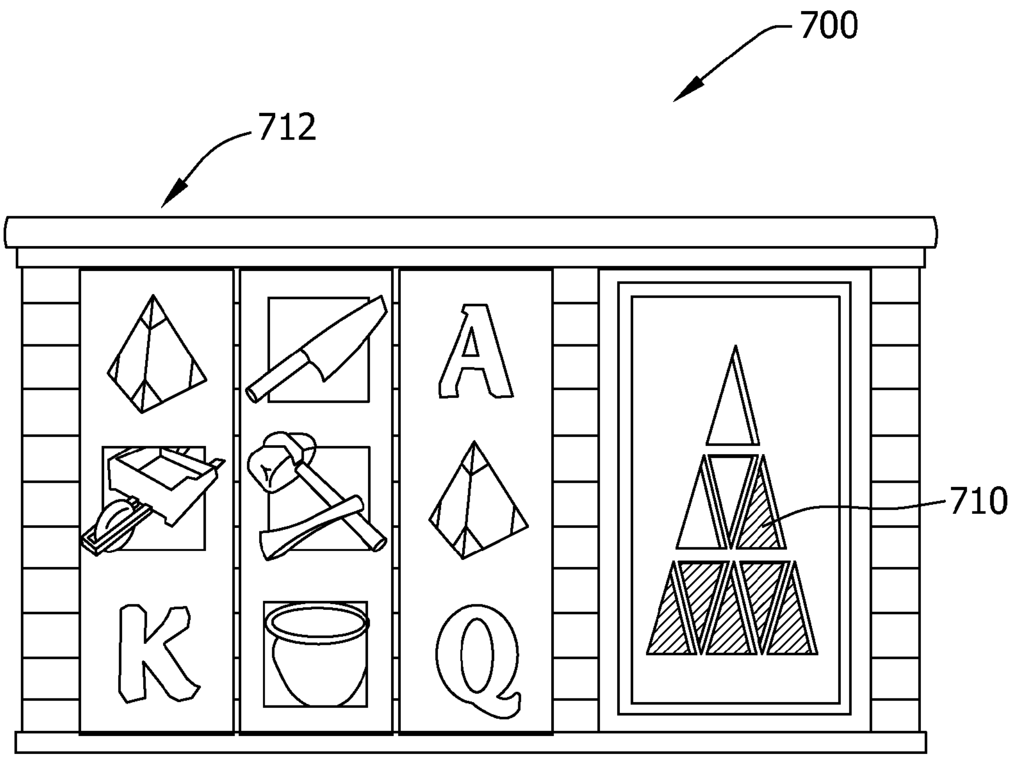
Figure 9:
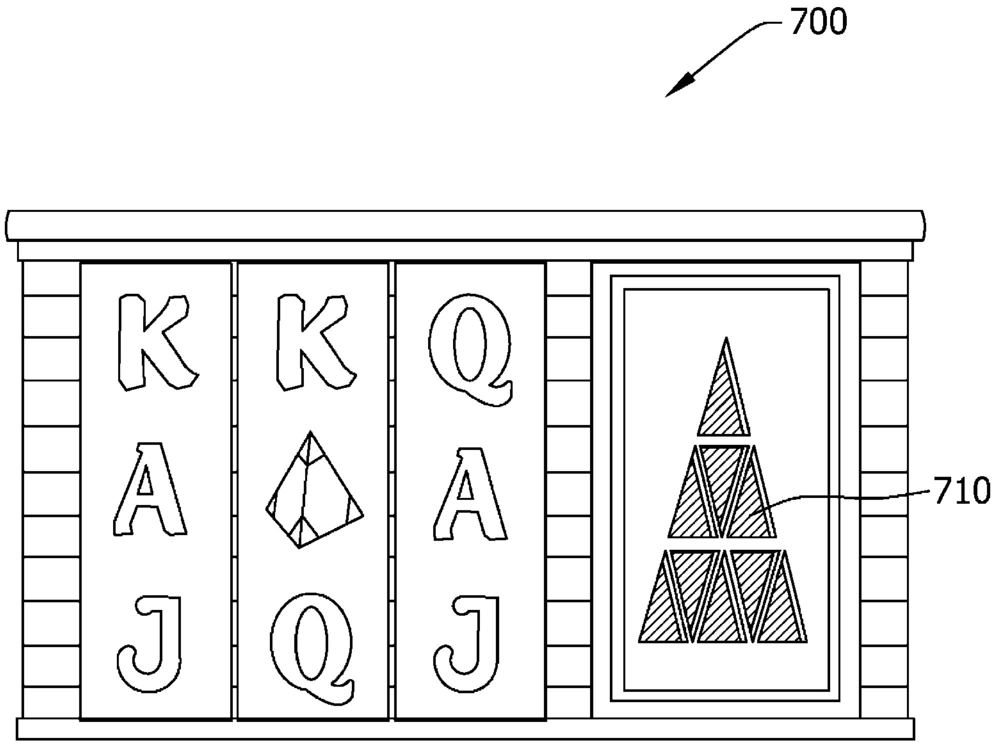

FIGS. 7-9 show screen views of an exemplary bonus game 700 displayed by gaming machine 100 (shown in FIGS. 1 and 2). In the exemplary embodiment, bonus game 700 includes a plurality of symbols 702 arranged in a plurality of rows 704 and in a plurality of columns 706. Bonus game 700 also includes a token display area 708.

During play of bonus game 700, a player initiates bonus game 700 using, for example, buttons 108 or via touch on primary display device 118 (each shown in FIGS. 1 and 2). In the exemplary embodiment, each column 706 is depicted using video images on primary display device 118. In an alternative embodiment, each column 706 is produced on a separate reel device (not shown) that is positioned adjacent to an inner surface (not shown) of primary display device 118. In the exemplary embodiment, a token portion 710 is awarded when a predetermined number of token trigger symbols 712 are displayed as an outcome of bonus game 700. As each token portion 710 is awarded, the awarded token portions 710 are displayed in token display area 708. In the exemplary embodiment, the player is awarded a specified number of plays of bonus game 700. If, during the specified number of plays, the player is awarded a predetermined number of token portions 710, the player is awarded with a token award. In one embodiment, if the player is not awarded the predetermined number of token portions 710 during the specified number of plays, the number of awarded token portions 710 is saved to ROM 204 or RAM 208 (both shown in FIG. 2) and/or to token history 504 (shown in FIG. 5) of database 308 (shown in FIGS. 4 and 5).

It should be noted that the apparatus, methods, systems, and computer-readable storage media described herein may distribute token portions 710 and/or token symbols 712 without the use of bonus game 700. For example, base game 600 (shown in FIG. 6) may distribute token portions 710 and/or token symbols 712 based on predefined parameters, such as an amount of coin-in, a number of paylines wagered, a trigger symbol, a trigger combination of symbols, or any other suitable parameter or trigger. As another example, base game 600 may distribute token portions 710 and/or token symbols 712 using a mystery trigger.

Figure 10:
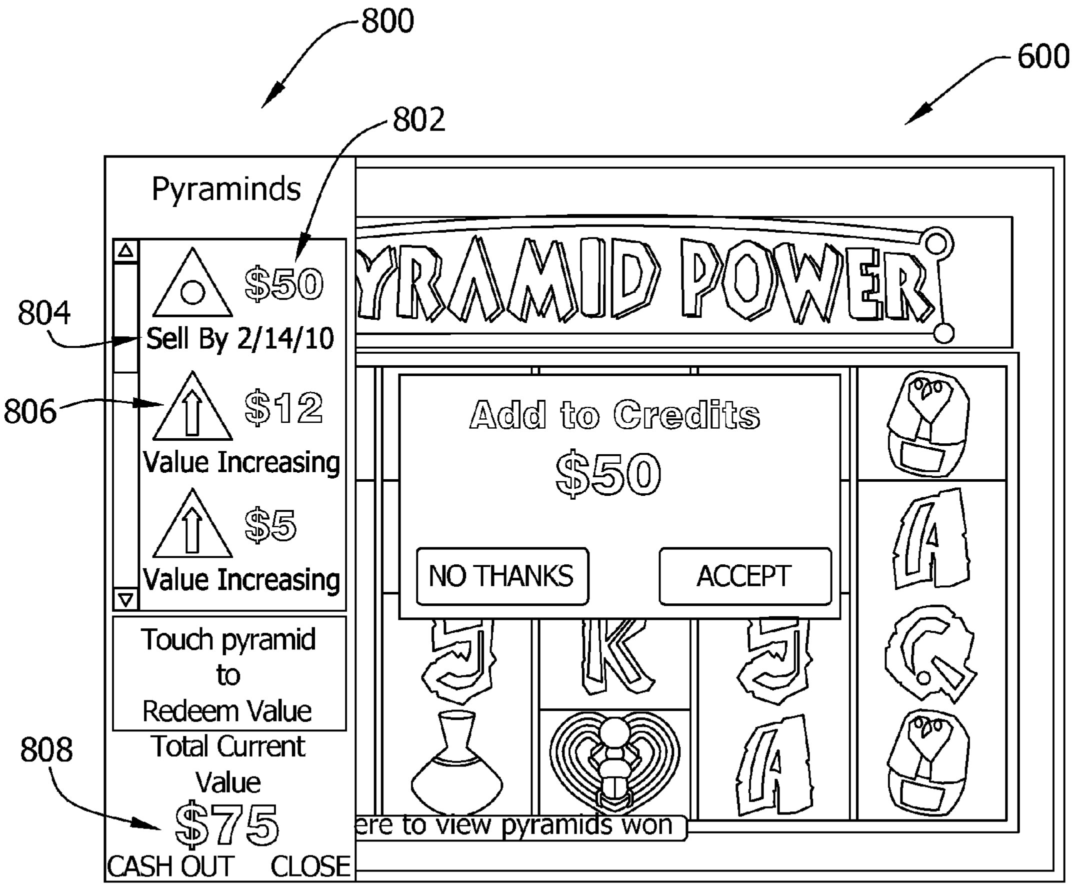
FIG. 10 is a view of an exemplary token interface that may be used with the gaming machine shown in FIG. 1.

FIG. 10 is a screen view of an exemplary token interface 800. In the exemplary embodiment, token interface 800 is displayed by activating token interface symbol 608 (shown in FIG. 6) on primary display 118 (shown in FIGS. 1 and 2). Token interface 800 includes, for each token awarded to a player, a current value 802, an optimum sell-by date 804, and a value trend 806. Token interface 800 also includes a total current value 808 of tokens awarded to the player. If the player elects to redeem a token, the player is prompted to confirm the value 802 to be added to the player's account. Moreover, in some embodiments, a player may initiate a token trade transaction, a token sale transaction, and/or a token purchase transaction via token interface 800.

Figure 11:
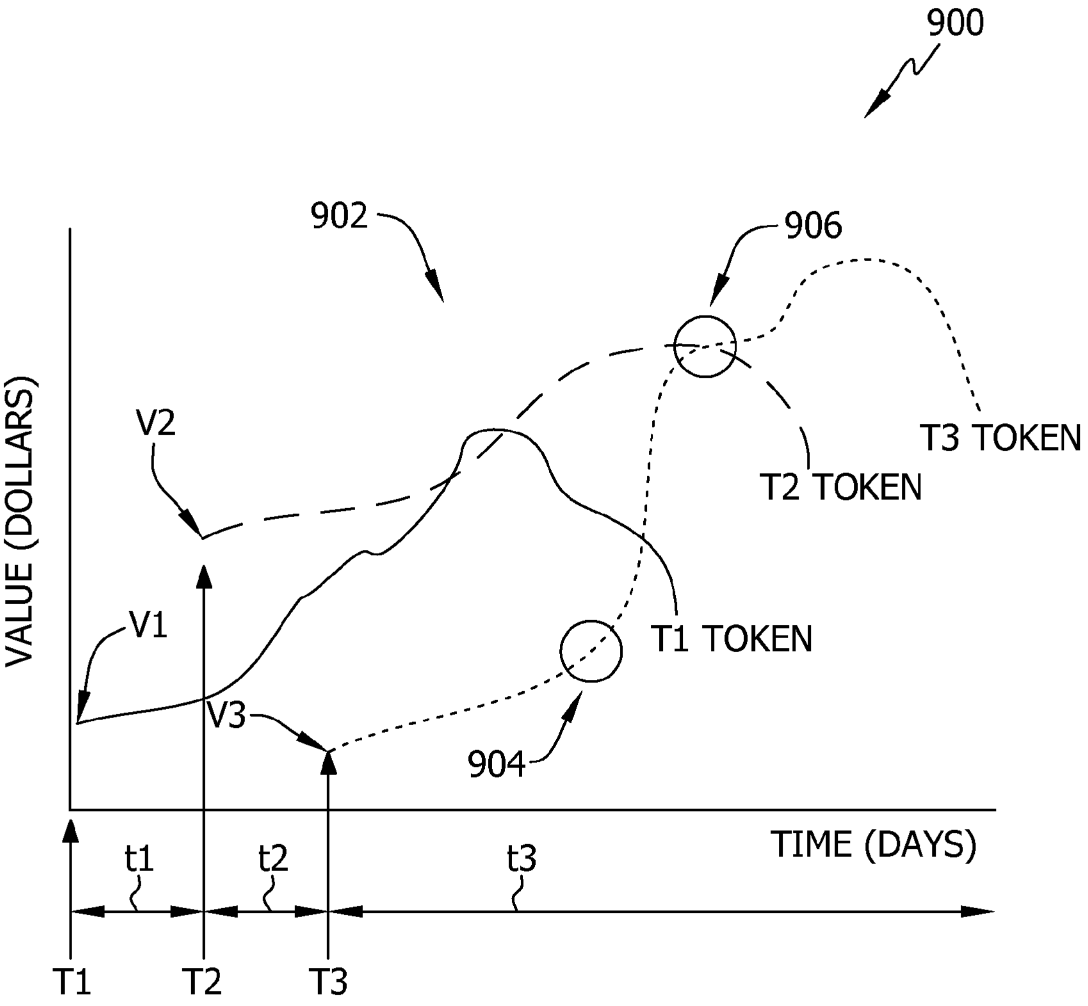
FIG. 11 is a graph that illustrates exemplary value trends for each of a plurality of different token types that may be awarded during play of the bonus game shown in FIGS. 7-9.

FIG. 11 is a graph 900 that illustrates exemplary value trends for each of a plurality of different token types 902. As shown in FIG. 11, a first token type T1 is issued to one or more players during a first time period t1. First token type T1 is issued at a first value V1 that is determined using system 300 (shown in FIG. 3) to control a statistical structure and/or based on a number or amount of awards available. At the start of a second time period t2, a second token type T2 is awarded to players with a second value V2. At the start of a third time period t3, a third token type T3 is awarded to players with a third value V3. In some embodiments, second token value V2 and/or third token value V3 are different than, such as higher than, first token value V1 at the initial point of being awarded to a player. Such value differences may be based on, for example and not by way of limitation, a promotional aspect and/or as part of a algorithmic process that stimulates higher player loyalty.

In the exemplary embodiment, first token type T1 is also awarded to players during second time period t2 and/or third time period t3. In an alternative embodiment, first token type T1 is no longer awarded to players after first time period t1 has ended. Similarly, in the exemplary embodiment, second token type T2 is awarded to players during third time period t3. In an alternative embodiment, second token type T2 is no longer awarded to players after second time period t2 has ended.

Moreover, in the exemplary embodiment and, as shown in FIG. 11, first value V1 changes, such as rises or falls, during each time period t1, t2, and t3 based on the number of players that have been awarded first token type T1, whether during first time period t1 or during subsequent second and third time periods t2 and t3. Similarly, second value V2 changes, such as rises or falls, during each time period t2 and t3 based on a number of players that have been awarded second token type T2, whether during second time period t2 or during subsequent third time period t3. For example, at a first point 904 during third time period t3, third value V3 increases as shown in FIG. 11 due to, for example, a promotional period that is sponsored by an advertiser. In another example, at a second point 906 during third time period t3, a player cashes out second value V2 of his second token type T2, thereby causing a decrease in second value V2 and/or a decrease in an index value of third token type T3.

Figure 12:
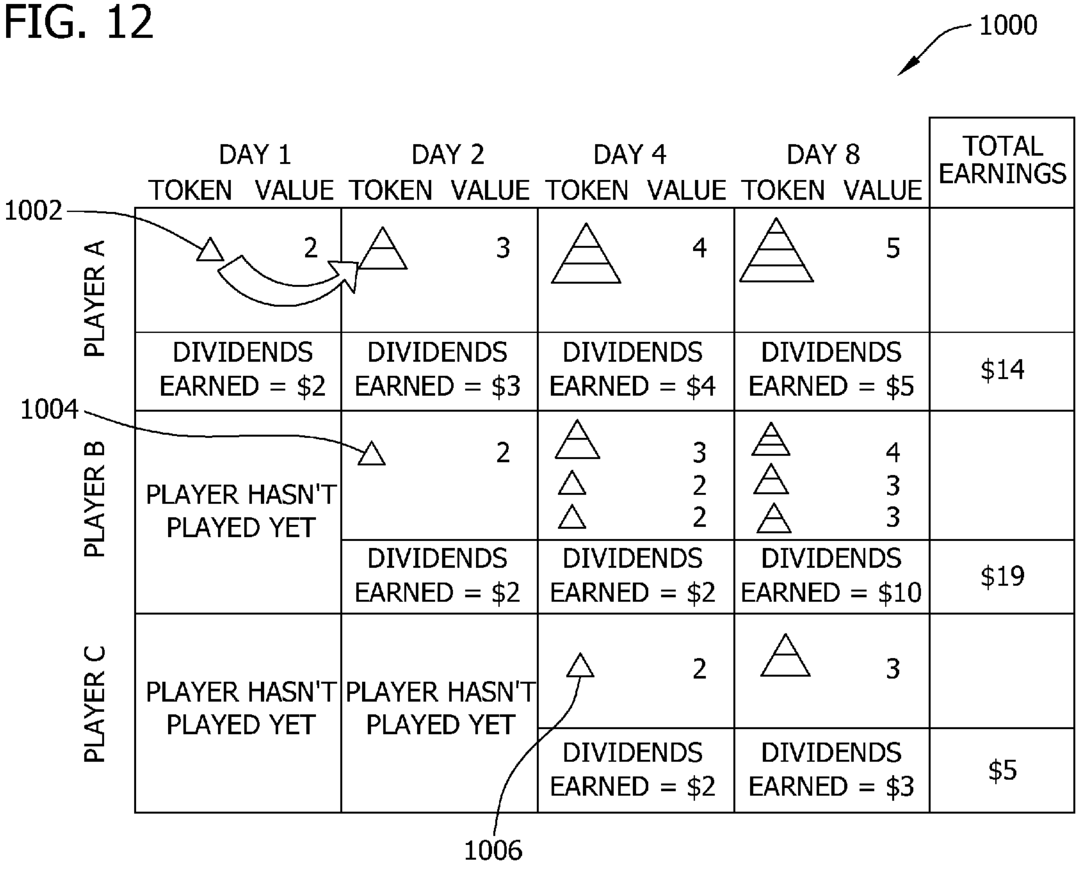
FIG. 12 is a chart that illustrates an exemplary time varying nature of a value of a token awarded to a player using the gaming system shown in FIG. 3.

FIG. 12 is a chart 1000 that illustrates an exemplary time varying nature of a value of a token awarded to a player using system 300 (shown in FIG. 3). As shown in FIG. 12, and in the exemplary embodiment, on a first day, Day 1, a first player, Player A, wins a token 1002. Token 1002 includes an initial value, which increases over time from Day 1 until an eighth day, Day 8. As shown in FIG. 12, token 1002 has an initial value of two dollars, which increases in value such that, at Day 8, token 1002 has a value of fourteen dollars.

Moreover, a second player, Player B, is awarded a token 1004 on a second day, Day 2. In the exemplary embodiment, token 1004 has the same initial value as token 1002 awarded to Player A on Day 1. In an alternative embodiment, token 1004 has a different initial value than token 1002. In addition, Player B is awarded two additional tokens 1006 on a fourth day, Day 4. In the exemplary embodiment, each token 1006 has the same initial value as tokens 1002 and 1004. In an alternative embodiment, each token 1006 has a different initial value than token 1002 and/or token 1004. The value of token 1004 increases over time from Day 2 until Day 8. Similarly, the value of token 1006 increases over time from Day 4 until Day 8. As shown in FIG. 12, token 1004 has an initial value of two dollars, which increases in value such that, at Day 8, token 1004 has a value of four dollars. Similarly, each token 1006 has an initial value of two dollars, which increases in value such that, at Day 8, each token 1006 has a value of three dollars.

Further, a third player, Player C, is awarded token 1006 on Day 4. In the exemplary embodiment, token 1006 has the same initial value as tokens 1002 and 1004. In an alternative embodiment, token 1006 has a different initial value than token 1002 and/or token 1004. The value of token 1006 increases over time from Day 4 until Day 8. As shown in FIG. 12, token 1006 has an initial value of two dollars, which increases in value such that, at Day 8, token 1006 has a value of three dollars.

Figure 13:
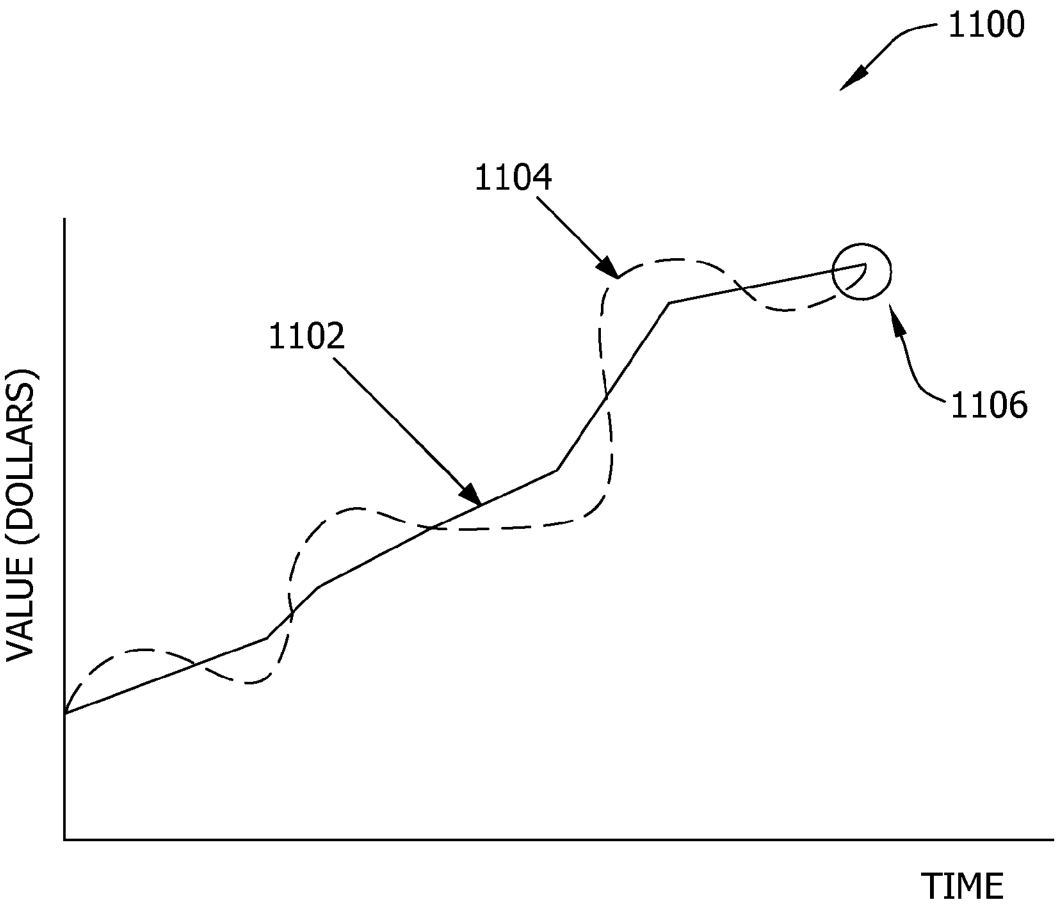
FIG. 13 is a graph that illustrates a time-varying nature of a progressive award value that may be used with the gaming system shown in FIG. 3.
Figure 14:
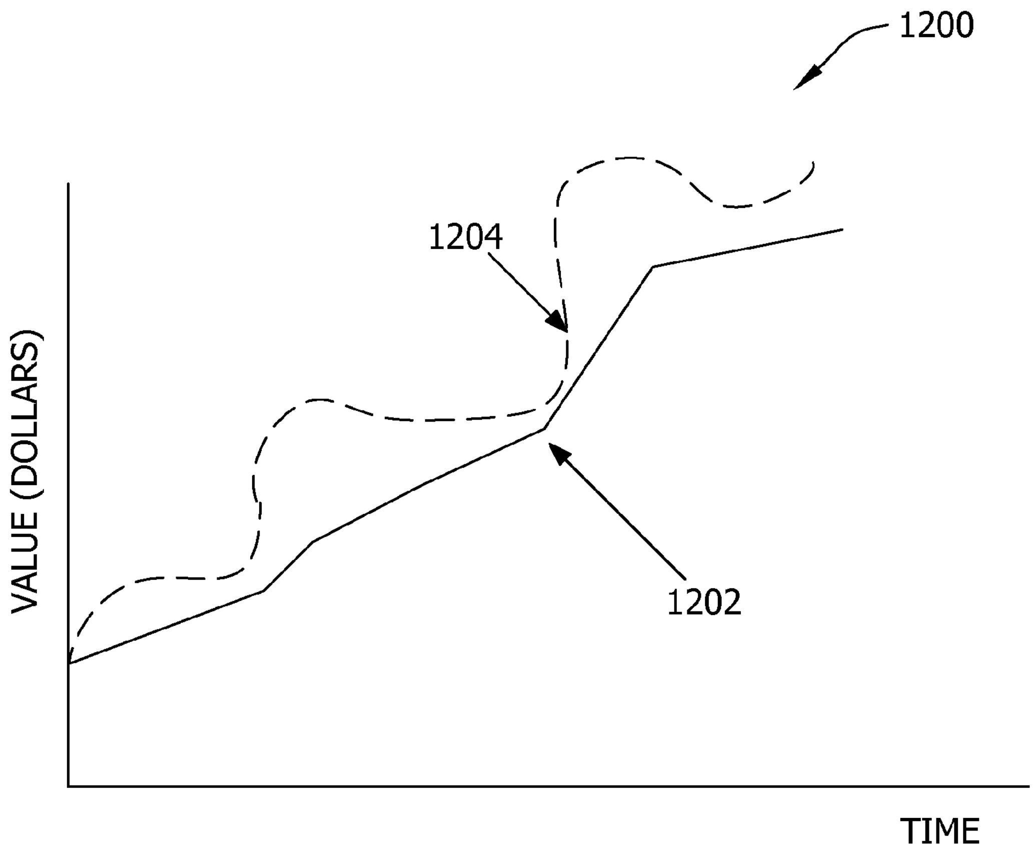
FIG. 14 is a graph that illustrates an alternative embodiment in which the progressive award value shown in FIG. 13 is split into two components.
Figure 15:
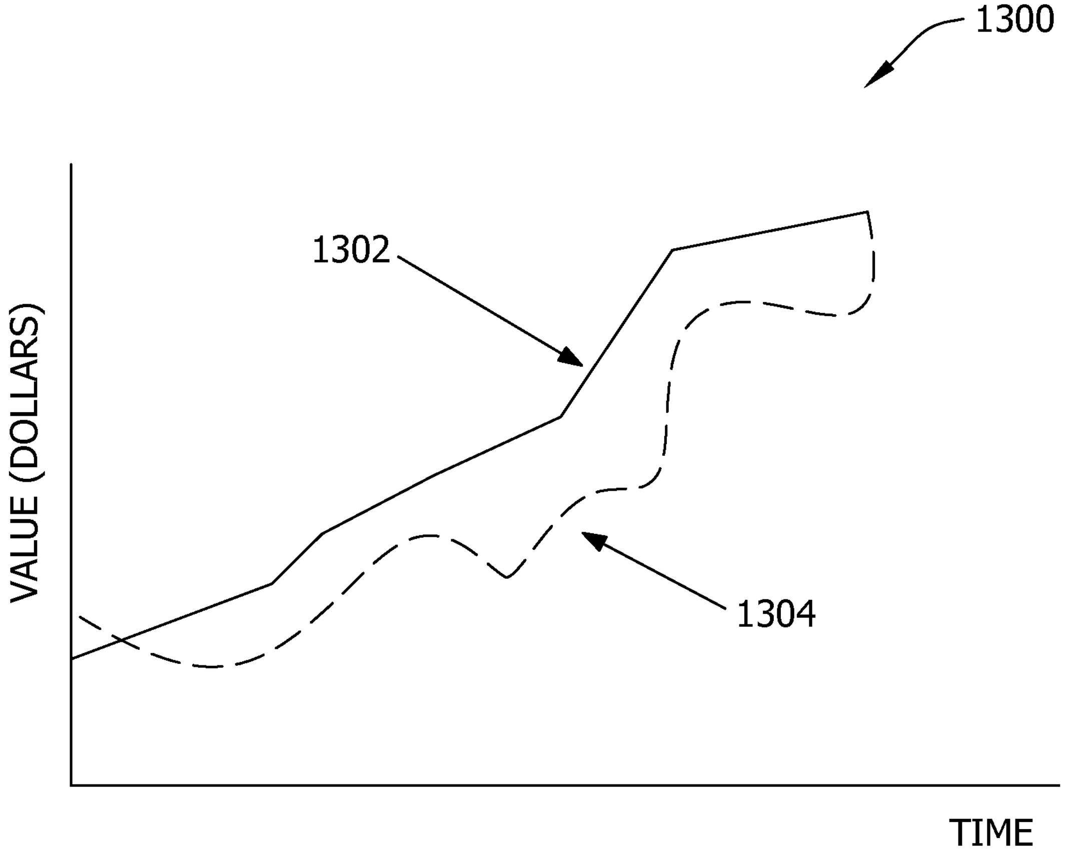
FIG. 15 is a graph that illustrates another alternative embodiment in which the progressive award value shown in FIG. 13 is split into two components.

FIGS. 13-15 are graphs that illustrate an exemplary progressive award component of the embodiments described herein. Such a progressive award component enables progressive award pools to be built using various time-based rules and algorithmic reallocation of declining token values. Moreover, such a progressive award component facilitates increasing player loyalty by providing additional or larger progressive awards to long-term players, providing a "super win" for players that have lost accumulated token value over time, and/or providing a periodic stimulus to extend current play sessions. In one embodiment, players are entered in a progressive contest by initiating a sales transaction of one or more tokens or token types with system 300 (shown in FIG. 3). In an alternative embodiment, players are entered in a progressive contest after being awarded with a token of a particular type, or after completing a token portfolio.

FIG. 13 is a graph 1100 that illustrates an exemplary time-varying nature of a progressive award value as displayed to players via, for example, electronic screen 312 (shown in FIG. 3). Graph 1100 includes a first line 1102 that represents a typical linear progressive award that accumulates value based on coin-in, for example. A second line 1104 represents a progressive award with perturbations. In the exemplary embodiment, a value associated with second line 1104 is displayed to players via electronic screen 312. The progressive award is awarded at a specified time and/or when the progressive award value reaches a specified amount 1106.

FIG. 14 is a graph 1200 that illustrates an alternative embodiment in which the progressive award value is split into two components. A first line 1202 represents a typical linear progressive award that accumulates value based on coin-in. A second line 1204 represents a randomized bonus value that is added to the value represented by first line 1202. The bonus value may be funded by, for example, a sponsorship and/or a second percentage of coin-in. In the exemplary embodiment, electronic screen 312 displays only the value represented by second line 1204 to increase player anticipation and to leave the player with an impression that he can track the progressive award value similar to a stock market index.

FIG. 15 is a graph 1300 that illustrates another alternative embodiment in which the progressive award value is split into two components. Similar to graph 1200 of FIG. 14, a first line 1302 represents a typical linear progressive award that accumulates value based on coin-in. A second line 1304 represents a randomized bonus value that is a ceiling for any progressive award amount that may be won by a player. More specifically, second line 1304 represents a ceiling of the progressive award value. In the exemplary embodiment, electronic screen 312 displays only the value represented by second line 1304 to increase player anticipation and to leave the player with an impression that he can track the progressive award value similar to a stock market index.

Figure 16:
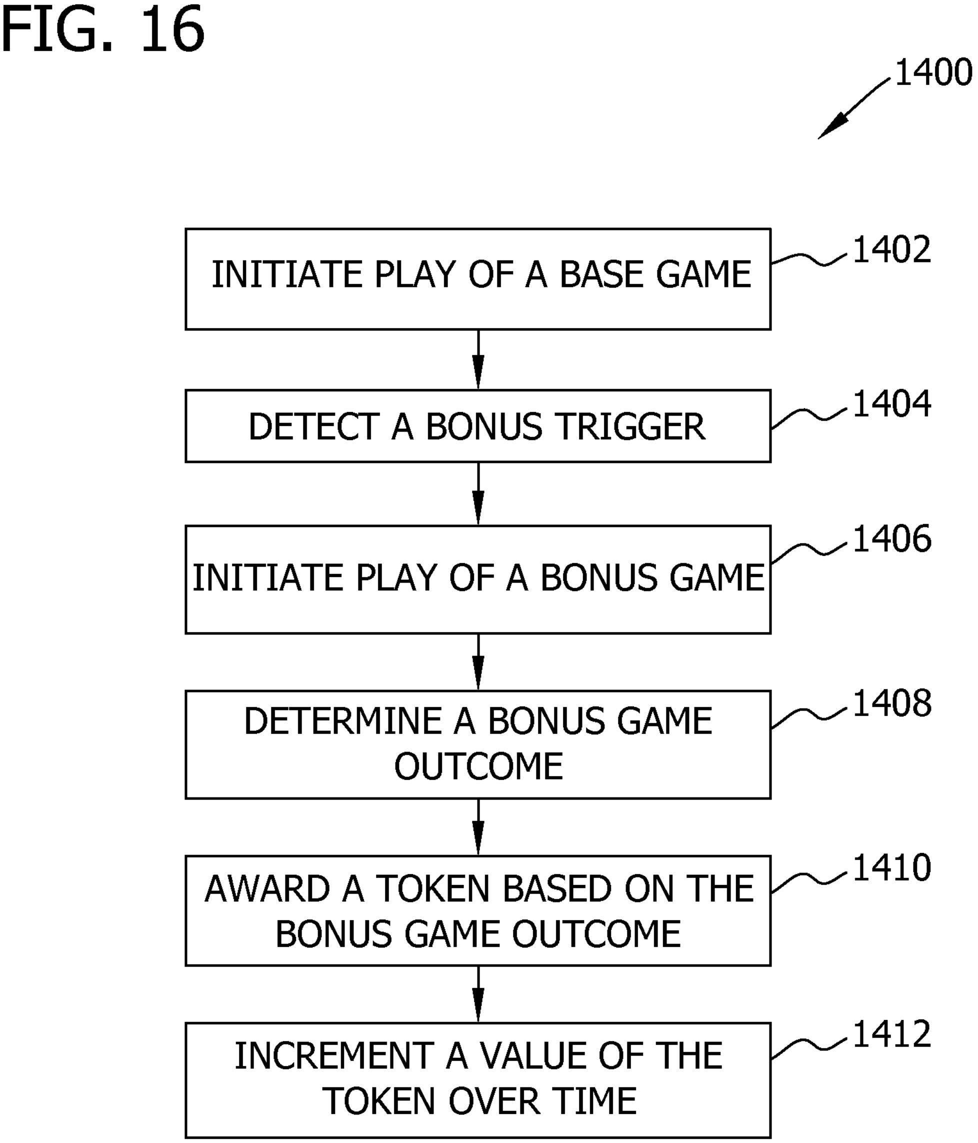
FIG. 16 is a flowchart that illustrates an exemplary method for providing awards using the gaming system shown in FIG. 3.

FIG. 16 is a flowchart that illustrates an exemplary method 1400 for providing awards using gaming system 300 (shown in FIG. 3).

In the exemplary embodiment, a player initiates 1402 play of a base game at gaming machine 100 (shown in FIGS. 1 and 2). During play of the base game, gaming machine 100 detects 1404 a bonus trigger. More specifically, gaming machine controller 202 (shown in FIG. 2) detects a bonus trigger, which may be a particular bonus symbol or combination of symbols obtained as an outcome of the base game. For example, gaming machine controller 202 detects one or more trigger symbols 612 (shown in FIG. 6) in an outcome of the base game. In an alternative embodiment, a server, such as server 302, 304, or 306 (shown in FIG. 3) detects the one or more trigger symbols 612.

In the exemplary embodiment, and in response to detection of the one or more trigger symbols 612, gaming machine 100 initiates 1406 play of a bonus game. Specifically, gaming machine controller 202 initiates play of the bonus game. During play of the bonus game, gaming machine controller 202 determines 1408 a bonus game outcome. Gaming machine controller 202 awards 1410 a token based on the bonus game outcome. In an alternative embodiment, a server, such as server 302, 304, or 306, initiates play of the bonus game, determines the bonus game outcome, and/or awards the token based on the bonus game outcome. In another alternative embodiment, gaming machine controller 202 awards 1410 a token based on a base game outcome.

In the exemplary embodiment, the token has an initial value. Token management server 302 increments 1412 the value of the token over. For example, the value of the token may be increased based on play by the same player or by a plurality of players. In some embodiments, the value of the token increases based on tokens earned by a community of players, rather than based on play by all players. For example, and referring to FIG. 12, Player A may designate or invite Player B, but not Player C, to be aligned with Player A. In such embodiments, token 1002 gains value based on game play and/or tokens earned by Player B, but not based on game play and/or tokens earned by Player C. Moreover, Player B may designate or invite Player C to be aligned with Player B in a similar arrangement. Furthermore, in some embodiments, game play and/or tokens earned by Player C affect the value of only Player B's token 1004 but not Player A's token 1002 because Player A did not designate or invite Player C. In other embodiments, game play and/or tokens earned by Player C affect the value of both Player A's token 1002 and Player B's token 1004.

In an alternative embodiment, in order for the value of the token to increment 1412, the player must visit the casino, log into gaming system 300, and accept the increased value (e.g., interest) via a token interface, such as token interface 800 (shown in FIG. 10). Accordingly, in such an embodiment, and referring again to FIG. 12, if Player A does not visit the casino on Day 2 to accept the increased value, token 1002 would maintain its original value. Thereafter, if Player A visits the casino on Day 4 and accepts the increased value, only the increased value for Day 4 would be added to the token value. In such an embodiment, the player is not repeatedly redeeming the token value but, rather, is validating and accepting the increased value.

Figure 17:
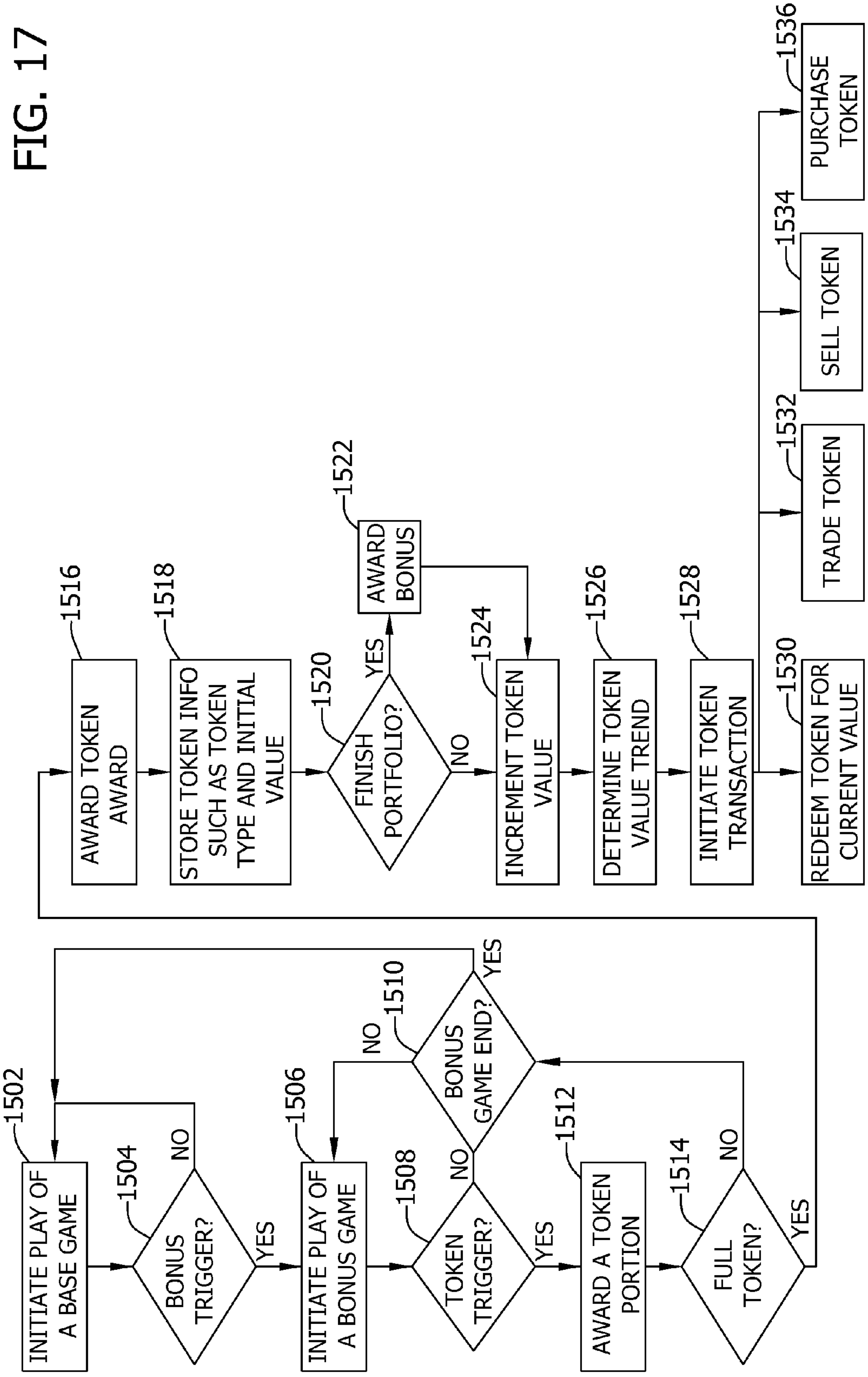
FIG. 17 is a flowchart that further illustrates the method shown in FIG. 16.

FIG. 17 is a flowchart 1500 that further illustrates method 1400 (shown in FIG. 16). As described above, a player initiates 1502 play of a base game at gaming machine 100 (shown in FIGS. 1 and 2). During play of the base game, a plurality of symbols 602 (shown in FIG. 6) is displayed in a row-and-column matrix. Moreover, during play of the base game, gaming machine 100 determines 1504 whether one or more bonus symbols 612 are present in the base game outcome. More specifically, gaming machine controller 202 (shown in FIG. 2) detects a bonus trigger, which may be a particular bonus symbol or combination of symbols obtained as an outcome of the base game. If gaming machine controller 202 does not detect a bonus trigger, the base game is continued. In an alternative embodiment, a server, such as server 302, 304, or 306 (shown in FIG. 3) detects the one or more trigger symbols 612.

In the exemplary embodiment, and in response to detection of the one or more trigger symbols 612, gaming machine 100 initiates 1506 play of a bonus game. Specifically, gaming machine controller 202 initiates play of the bonus game. During play of the bonus game, a plurality of symbols 702 (shown in FIGS. 7-9) is displayed in a row-and-column matrix. Moreover, during play of the bonus game, gaming machine controller 202 determines 1508 whether a bonus game outcome includes a token trigger symbol 712 (shown in FIGS. 7-9). If gaming machine controller 202 does not detect a token trigger symbol, gaming machine controller 202 determines 1510 whether the bonus game is over. If the bonus game is over, the player is returned to the base game. If the bonus game is not over, the player is returned to play the bonus game again. In an alternative embodiment, a server, such as server 302, 304, or 306 detects the one or more token trigger symbols 712.

In the exemplary embodiment, gaming machine 100 awards 1512 token portion 710 (shown in FIGS. 8 and 9). Specifically, gaming machine controller 202 awards token portion 710 for each token trigger symbol 712 detected in the bonus game outcome. In an alternative embodiment, gaming machine controller 202 awards a single token portion 710 for any number of token trigger symbols 712 detected in the bonus game outcome. Moreover, gaming machine 100 determines 1514 whether each awarded token portion 710 fills token display area 708. Specifically, gaming machine controller 202 compares a current number of token portions 710 to a number of token portions 710 needed to earn a token award. If the player has earned the necessary number of token portions 710, gaming machine 100 awards 1516 the player with a token award, which includes an initial value. More specifically, gaming machine controller 202 awards the player a token award. If the player has not earned the necessary number of token portions 710, gaming machine controller 202 again determines 1510 whether the bonus game is over. After awarding the token award, gaming machine 100 stores 1518 token award information, including the initial value and/or a token type. More specifically, gaming machine controller 202 stores the initial value and/or the token type in ROM 204 or RAM 208. In addition, gaming machine controller 202 transmits the initial value and/or token type to token management server 302, which stores the initial value and/or token type in database 308 (shown in FIG. 3). In an alternative embodiment, token management server 302 awards each token portion 710 and/or a token award. Specifically, token management server 302 awards each token portion 710 and/or token award, and communicates the award result to gaming machine 100, which displays the award result via, for example, primary display device 118.

In the exemplary embodiment, token management server 302 monitors player token history 504 and/or player token records 506 (each shown in FIG. 5) to determine 1520 whether the player has acquired one or more token awards for each of a number of token types. If the player has acquired the necessary token awards, token management server 302 awards the player with an additional award.

Moreover, token management server 302 increments 1524 the value of the token award. In one embodiment, token management increments the value only during a single play session by the player, such that when the player stops playing at gaming machine 100, the value is no longer incremented by token management server 302. In an alternative embodiment, token management server 302 increments the value over a plurality of play sessions. For example, token management server 302 may increment the value of the token award during a plurality of play sessions that are separated by periods of non-play but not during the periods of non-play. As another example, token management server 302 may increment the value of the token award during a plurality of play sessions, including during period of non-play that separate each play session. Moreover, in one embodiment, accounting server 304 applies a portion of each wager made by the player at gaming machine 100 to a token pool. In such an embodiment, token management server 302 increments the award value based on an accumulated value of the token pool. In another alternative embodiment, token management server 302 increments the award value based on a player level of the player. In yet another alternative embodiment, token management server 302 increments the award value based on a frequency of play by the player. In still another alternative embodiment, token management server 302 may instead decrement the token value based on, for example and not by way of limitation, a length of a time period between play sessions. Token management server 302 may also assign an expiration date to the token.

Furthermore, in the exemplary embodiment, token management server 302 determines 1526 a token value trend for each token award and/or each token type. The token value trend is displayed to the player via token interface 800 (shown in FIG. 8), which enables a player to initiate 1528 a token transaction. For example, and in the exemplary embodiment, the player may redeem 1530 a token for current value 802 (shown in FIG. 8). Token management server 302 communicates current value 802 to gaming machine 100, which displays current value 802 and a confirmation to the player. If the player confirms the redemption transaction, current value 802 is applied to the player's current credits. The player may also trade 1532 a particular token for a different token, sell 1534 a token for credits or a chance to participate in an alternative game, and/or purchase 1536 a token from another player or from system 300. Alternatively, the token value may be used by token management sever 302 to determine a recurring prize amount that is awarded to the player, as long as the player has not redeemed, traded, or sold the token. The recurring prize amount may accumulated to earn free play time or any other suitable prize. For example, the recurring prize may be gaming credits, a secondary bonus currency, or lottery tickets. In another alternative embodiment, the player may redeem the token value for non-gaming prizes such as, but not limited to, hotel upgrades, clothing or other merchandise, and/or food and drink. Moreover, in some embodiments, the player may redeem the token value online via, for example, remote computer 316. In such embodiments, the player may be offered double points or some similar prize.

Exemplary embodiments of apparatus, systems, methods, and computer-readable storage media for awarding dynamically valued tokens during game play are described above in detail. The apparatus, systems, methods, and storage media are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A gaming machine or gaming system server, such as those described herein, includes at least one processor or processing unit and a system memory. The gaming machine or gaming system typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment. Examples of well known gaming systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming machine configured to communicate with at least one server via a network, said gaming machine comprising:

a display device configured to display a base game at said gaming machine; and a controller coupled to said display device, said controller configured to operate with the display device to:

(a) determine an outcome of a play of the base game;

(b) display the determined outcome of said play of the base game;

(c) award a player at least one token based on the displayed outcome of said play of the base game, wherein each awarded token is associated with an initial monetary value; and (d) for each awarded token:

(i) display the initial monetary value associated with said token; and (ii) enable the player to redeem said token for a current monetary value of said token, wherein said token is initially redeemable for said initial monetary value associated with said token and said monetary value of said token increases based on additional play of the base game.

2. The gaming machine of claim 1, wherein, for each awarded token, the monetary value of said token increases only during a single play session.

3. The gaming machine of claim 1, wherein, for each awarded token, the monetary value of said token increases over a plurality of play sessions.

4. The gaming machine of claim 1, wherein the controller is configured to operate with the display device to display a token interface including, for each awarded token, at least one of the current monetary value and a monetary value trend for said token.

5. The gaming machine of claim 4, which includes at least one input device, and wherein the controller is configured to operate with the at least one input device to receive a redemption request for at least one awarded token, and to initiate the redemption request via the at least one server.

6. The gaming machine of claim 4, which includes at least one input device, and wherein the controller is configured to operate with the at least one input device to receive a token trade transaction input, and to initiate the token trade transaction with at least one other player via the at least one server.

7. The gaming machine of claim 4, which includes at least one input device, and wherein the controller is configured to operate with the at least one input device to receive a token sale transaction input from the player, and to initiate the token sale transaction with at least one other player via the at least one server.

8. The gaming machine of claim 4, which includes at least one input device, and wherein the controller is configured to operate with the at least one input device to receive a token purchase transaction input from the player, and to initiate the token purchase transaction with at least one other player via the at least one server.

9. The gaming machine of claim 1, wherein each awarded token includes a plurality of token portions that are each awarded based on outcomes of plays of the base game.

10. The gaming machine of claim 9, wherein said controller is configured to award each token portion based on at least one of a trigger symbol and a trigger combination generated during one or more plays of the base game.

11. The gaming machine in accordance with claim 1, wherein: said display device is further configured to display a bonus game; and said controller is further configured to: detect a bonus trigger during play of the base game; display the bonus game; and award the at least one token based on an outcome of the bonus game, wherein the value of the token increases based on additional play by the player of the base game and the bonus game.

12. The gaming machine of claim 1, wherein, for each awarded token, the monetary value of said token increases as players earn other tokens during play of the base game.

13. A non-transitory computer readable medium storing a plurality of instructions which, when executed by at least one processor, cause the at least one processor to (a) cause at least one display device to display a play of a base game via the gaming machine;

(b) determine an outcome of said play of the base game;

(c) cause the at least one display device to display the determined outcome of said play of the base game;

(d) award a player at least one token based on the displayed outcome of said play of the base game, wherein each awarded token is associated with an initial monetary value; and (e) for each awarded token:

(i) cause the at least one display device to display the initial monetary value associated with said token;

(ii) increment the monetary value of said token based on additional play of the base game; and (iii) enable the player to redeem said token for a current monetary value of said token.

14. The non-transitory computer readable medium of claim 13, wherein the plurality of instructions, when executed by the at least one processor, cause the at least one processor to, for each awarded token, increment the monetary value of said token during a single play session by the player and over a plurality of play sessions.

15. The non-transitory computer readable medium of claim 13, wherein the plurality of instructions, when executed by the at least one processor, cause the at least one processor to operate with at least one input device to receive a redemption request for at least one token; and apply at least a portion of the current monetary value of said at least one token to game play credits of the player.

16. The non-transitory computer readable medium of claim 13, wherein each awarded token is one of a plurality of different token types, and wherein the plurality of instructions, when executed by the at least one processor, cause the at least one processor to award at least one token of each token type during a predefined time period.

17. The non-transitory computer readable medium of claim 13, wherein the plurality of instructions, when executed by the at least one processor, cause the at least one processor to store a token type of each token awarded; and award a prize for obtaining a token associated with each token type.

18. The non-transitory computer readable medium of claim 13 , wherein the plurality of instructions, when executed by the at least one processor, cause the at least one processor to apply a portion of each wager made at the gaming machine to a token pool; and increment the monetary value of at least one token based on an accumulated value of the token pool.

19. The non-transitory computer readable medium of claim 13 , wherein the plurality of instructions, when executed by the at least one processor, cause the at least one processor to display a bonus game in response to a detection of a bonus trigger during play of the base game; determine an outcome of the bonus game; award at least one token based on the determined outcome of the bonus game, and increment the monetary value of the token based on additional play of the base game and the bonus game.

20. The non-transitory computer readable medium of claim 13, wherein the plurality of instructions, when executed by the at least one processor, cause the at least one processor to, for each awarded token, increment the monetary value of said token as additional players earn tokens during play of the base game.

21. The gaming machine of claim 1, wherein, for each awarded token, the monetary value of said token increases based on a number of players awarded tokens during a time period.

22. The non-transitory computer readable medium of claim 13, wherein, for each awarded token, the monetary value of said token is incremented based on a number of players awarded tokens during a time period.

* * * * *

UNITED STATES PATENT AND TRADEMARK OFFICE

CERTIFICATE OF CORRECTION

PATENT NO. : 8,777,729 B2
APPLICATION NO. : 12/618463
DATED : July 15, 2014
INVENTOR(S) : Matthew Belger et al.

It is certified that error appears in the above-identified patent and that said Letters Patent is hereby corrected as shown below:

IN THE CLAIMS

In Claim 6, Column 15, Line 60, replace “the” with --a--.
In Claim 7, Column 15, Line 65, replace the second instance of “the” with --a--.
In Claim 8, Column 16, Line 4, replace the second instance of “the” with --a--.
In Claim 11, Column 16, Line 19, between the second instance of “the” and “value” insert --monetary--.
In Claim 11, Column 16, Line 19, between the third instance of “the” and “token” insert --at least one--.
In Claim 13, Column 16, Line 27, after “to” insert --:--.
In Claim 13, Column 16, Line 29, replace “the” with --a--.
In Claim 19, Column 17, Line 14, between the first instance of “the” and “token” insert --at least one--.

Signed and Sealed this
Seventeenth Day of May, 2016

Michelle K. Lee

Michelle K. Lee
*Director of the United States Patent and Trademark Office*